(12) United States Patent
Cairns et al.

(10) Patent No.: US 7,182,617 B1
(45) Date of Patent: Feb. 27, 2007

(54) HARSH ENVIRONMENT SEALING APPARATUS FOR A CABLE END AND CABLE TERMINATION AND ASSOCIATED METHODS

(75) Inventors: James L. Cairns, Ormond Beach, FL (US); Stewart M. Barlow, Ormond Beach, FL (US)

(73) Assignee: Ocean Design, Inc., Ormond Beach, FL (US)

( * ) Notice: Subject to any disclaimer, the term of this patent is extended or adjusted under 35 U.S.C. 154(b) by 0 days.

(21) Appl. No.: 11/322,698

(22) Filed: Dec. 30, 2005

(51) Int. Cl.
*H01R 13/40* (2006.01)
*H01R 13/52* (2006.01)

(52) U.S. Cl. ........................... 439/271; 439/587
(58) Field of Classification Search ................ 439/271, 439/275, 587
See application file for complete search history.

(56) References Cited

U.S. PATENT DOCUMENTS

| | | |
|---|---|---|
| 2,886,626 A | 5/1959 | Burnett |
| 3,633,155 A | 1/1972 | Taylor |
| 3,972,581 A | 8/1976 | Oldham |
| 4,003,620 A | 1/1977 | O'Brien et al. |
| 4,519,662 A | 5/1985 | Riley et al. |
| 4,630,848 A | 12/1986 | Twist |
| 4,666,242 A | 5/1987 | Cairns |
| 4,773,725 A | 9/1988 | Ashman et al. |
| 4,874,327 A | 10/1989 | Ip |
| 4,907,982 A | 3/1990 | Wagaman |
| 4,940,416 A | 7/1990 | Wagaman |
| 4,948,377 A | 8/1990 | Cairns |
| 5,162,617 A | 11/1992 | Ferbas |
| 5,194,012 A | 3/1993 | Cairns |
| 5,203,805 A | 4/1993 | Cairns |
| 5,357,057 A * | 10/1994 | Debbaut .................... 174/84 R |
| 5,645,438 A * | 7/1997 | Cairns ........................ 439/139 |
| 5,645,442 A | 7/1997 | Cairns |
| 5,648,639 A | 7/1997 | Hand |
| 5,691,505 A | 11/1997 | Norris |
| 5,771,927 A | 6/1998 | Johansen |
| 5,772,457 A | 6/1998 | Cairns |

(Continued)

FOREIGN PATENT DOCUMENTS

GB    2 233 838 A    1/1991

*Primary Examiner*—James R. Harvey
(74) *Attorney, Agent, or Firm*—Procopio, Cory, Hargreaves & Savitch

(57) ABSTRACT

A sealing apparatus is operative between a cable end and a cable termination and includes an elastomeric inner seal and an elastic outer seal. The sealing apparatus is for a cable end including a cable jacket and at least one cable member extending outwardly therefrom, with the cable termination including a base and at least one nipple extending outwardly therefrom. The elastomeric inner seal may have at least one nipple passageway for receiving and defining a seal with the at least one nipple, and at least one cable member passageway in communication with the at least one nipple passageway for receiving and defining a seal with the at least one cable member. The elastomeric outer seal may have opposing first and second open ends, with the first open end for engaging and defining a seal with the base. The elastomeric outer seal may also have an elastomeric inner seal passageway for receiving the elastomeric inner seal, and a cable end passageway extending in communication with the elastomeric inner seal passageway to the second open end for receiving and defining a seal with the cable jacket.

35 Claims, 16 Drawing Sheets

U.S. PATENT DOCUMENTS

| | | | |
|---|---|---|---|
| 5,772,842 A | 6/1998 | Tanaka | |
| 5,821,461 A * | 10/1998 | Sackett | 174/75 B |
| 5,873,750 A | 2/1999 | Cairns | |
| 6,017,227 A * | 1/2000 | Cairns et al. | 439/138 |
| 6,067,395 A | 5/2000 | Cairns | |
| 6,112,769 A | 9/2000 | Nicholson | |
| 6,315,461 B1 | 11/2001 | Cairns | |
| 6,321,021 B1 | 11/2001 | Cairns | |
| 6,332,787 B1 | 12/2001 | Barlow | |
| 6,364,677 B1 | 4/2002 | Nysveen | |
| 6,464,405 B2 | 10/2002 | Cairns | |
| 6,736,545 B2 | 5/2004 | Cairns | |
| 6,796,821 B2 | 9/2004 | Cairns | |
| 6,910,910 B2 * | 6/2005 | Cairns | 439/352 |

* cited by examiner

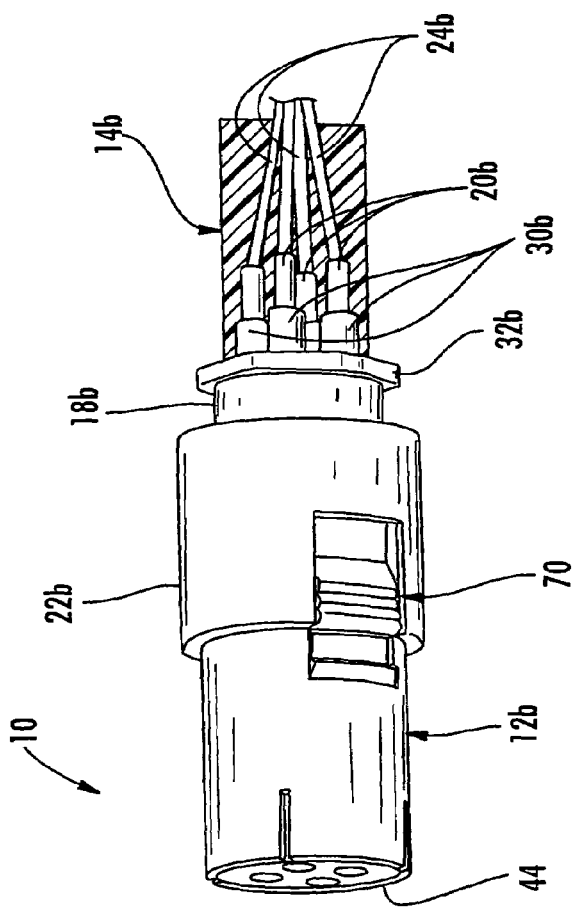
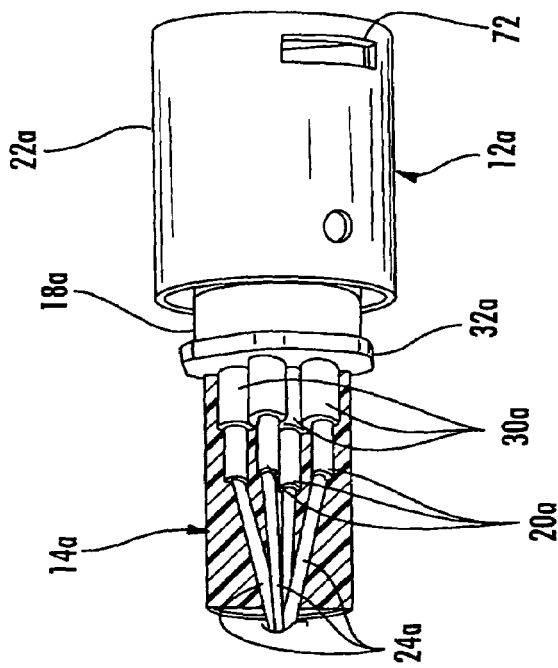
FIG. 5
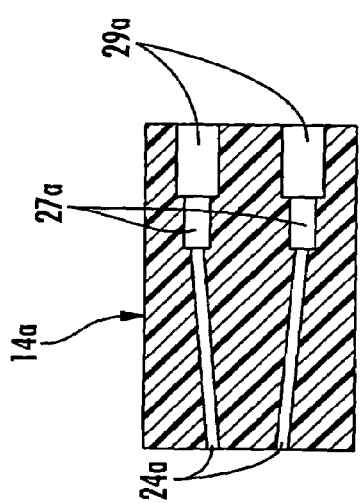
FIG. 6

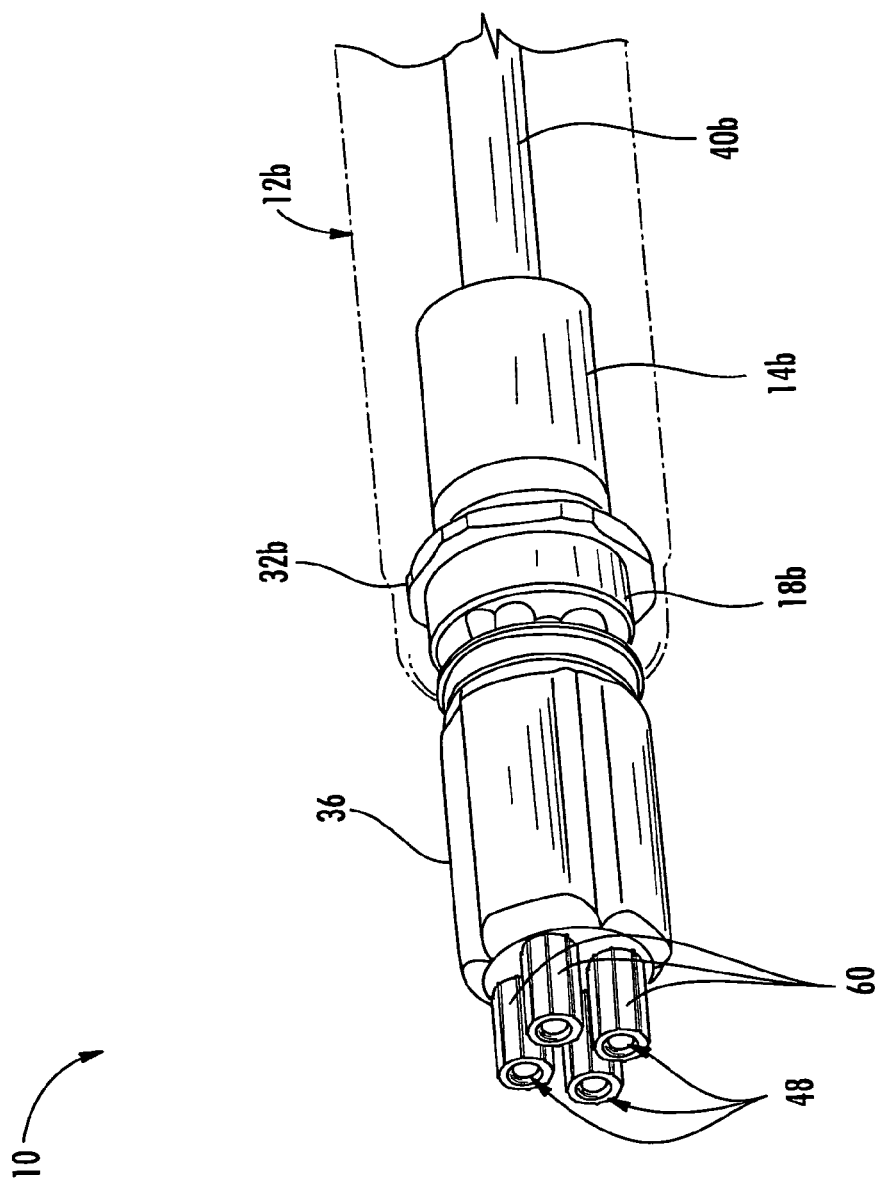
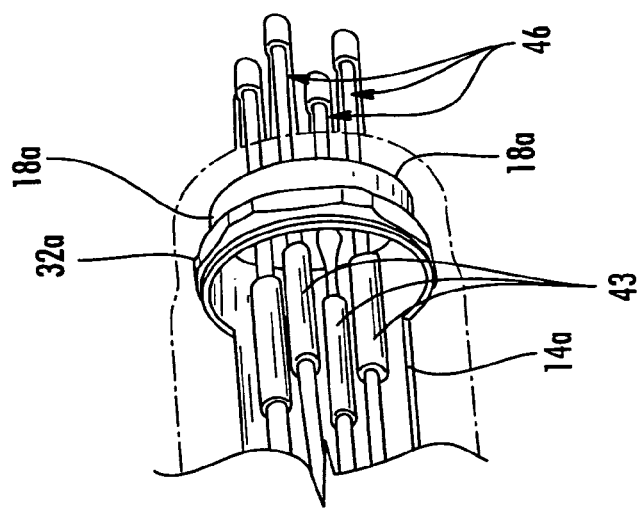
FIG. 13

HARSH ENVIRONMENT SEALING APPARATUS FOR A CABLE END AND CABLE TERMINATION AND ASSOCIATED METHODS

FIELD OF THE INVENTION

The invention relates to the field of cables, and, more particularly, to sealing a cable and cable termination and related methods.

BACKGROUND OF THE INVENTION

Underwater cables are commonly used to carry electrical power and/or telecommunications traffic. There is also typically a need to make connections between adjacent cable ends, or between a cable end and associated equipment, for example. Accordingly, there are also cable connectors for such harsh or underwater, high pressure environments. Such cable connectors not only have to operate under extreme conditions, but for some applications they may need to be mateable while submerged, that is, wet-mateable. A submersible robotic device may also typically be used to mate the wet-mateable cable connector portions, and such a robotic device may be limited in the types of movements and forces it is capable of generating.

The assignee of the present invention, Ocean Design, Inc. of Ormond Beach, Fla., has developed various significant improvements in wet-mateable connectors as disclosed in U.S. Pat. Nos. 4,948,377; 5,162,617; 5,194,012; 5,203,805; 5,645,438; 5,645,442; 5,772,457; 5,722,842; 5,873,750; 6,017,227; 6,067,395; 6,315,461; 6,332,787; 6,464,405; 6,736,545; 6,796,821; and 6,910,910, for example. The entire content of each of these patents is incorporated herein by reference.

U.S. Pat. No. 6,315,461, for example, discloses a wet-mateable connector comprising first and second connector portions being movable between unmated and mated positions. In addition, the connector also includes first and second tubular bladders in respective connector portions and cooperating therewith so that opposing ends of the tubular bladders are urged together and moved from a closed to an open position as the connector portions are moved from the unmated to the mated position. More particularly, the first connector portion includes a first tubular shell including interior portions defining a fixed oval constriction. The second connector portion comprises a second tubular shell and an actuator slidable therein and defining a slidable oval constriction. The second tubular bladder is extended longitudinally beyond the slidable and fixed oval constrictions and into the interior of the first shell when the connector portions are moved to the mated position. Accordingly, the bladders are in the open position, yet providing a seal therebetween to surrounding water, to permit engagement of contacts when mated. Conversely, the bladders are closed to seal the respective contacts from the surrounding water when in the unmated position. Commercial versions of this wet-mateable connector are offered from Ocean Design, Inc. of Ormond Beach, Fla. under the designation I-CONN™.

Another line of wet-mateable connectors is also offered by Ocean Design, Inc. of Ormond Beach, Fla. under the designation Nautilus™. For example, U.S. Pat. No. 5,203,805 discloses features of this connector. The Nautilus™ connector includes first and second connector portions movable between unmated and mated positions. The first connector portion comprises a first base, male contacts carried by the first base and extending outwardly therefrom, and a first shell carried by the first base and surrounding the male contacts. The second connector portion comprises a second base, and female contacts carried by the second base and extending outwardly therefrom. Individual bladders surround each female contact, and an overall bladder surrounds all of the individual bladders. This provides two bladder chambers surrounding each female contact. A second shell is carried by the second base and surrounds the bladders. The Nautilus™ connector also includes an end cap that is carried by a pair of oppositely positioned stalks that extend outwardly from the base. Moreover, the end cap includes several component parts to be manufactured and assembled.

Submersible connectors, such as the I-CONN™ and Nautilus™ connectors described above, also typically require a cable strain relief and sealing arrangement on the backside where the cable end is connected to the contacts that, in turn, are carried by the base. Typical approaches are relatively complicated and are desirably made in a factory setting, and not in the field. For example, heat shrink materials, and/or curable potting materials, such as polyurethane, have been used to effect the cable termination to the connector portion. These cable terminations may require heat or UV energy for curing, and are not readily disassembled either.

SUMMARY OF THE INVENTION

In view of the foregoing background, it is therefore an object of the invention to provide an effective sealing apparatus for use between a cable end and cable termination, such as a connector portion, and which may be readily made in the field.

This and other objects, features and advantages in accordance with the present invention are provided by a sealing apparatus operative between a cable end and a cable termination comprising an elastomeric inner seal and an elastic outer seal. More particularly, the sealing apparatus is for a cable end comprising a cable jacket and at least one cable member extending outwardly therefrom, with the cable termination comprising a base and at least one nipple extending outwardly therefrom. The elastomeric inner seal may have at least one nipple passageway for receiving and defining a seal with the at least one nipple, and at least one cable member passageway in communication with the at least one nipple passageway for receiving and defining a seal with the at least one cable member. The elastomeric outer seal may have opposing first and second open ends, with the first open end for engaging and defining a seal with the base. The elastomeric outer seal may also have an elastomeric inner seal passageway for receiving the elastomeric inner seal, and a cable end passageway extending in communication with the elastomeric inner seal passageway to the second open end for receiving and defining a seal with the cable jacket. The combination of the elastomeric inner seal and elastomeric outer seal provide an effective seal for harsh environments and may also be readily assembled onto a cable end in the field, if desired.

The at least one nipple passageway may define a constrictive seal with the at least one nipple devoid of adhesive. Similarly, the at least one cable member passageway may define a constrictive seal with the at least one cable member devoid of adhesive. The first open end of the elastomeric outer seal may also define a constrictive seal with the base devoid of adhesive.

The base may comprise a flange, and the first open end of the elastomeric inner seal may have a flange receiving recess therein to receive the flange of the base. The elastomeric inner seal passageway may also define a constrictive seal with the elastomeric inner seal devoid of adhesive. Similarly, the cable end passageway may define a constrictive seal with the cable jacket devoid of adhesive.

The at least one nipple may comprise a plurality thereof arranged in spaced apart relation, and the at least one nipple passageway may comprise a plurality thereof corresponding to the plurality of nipples. The at least one cable member passageway may also comprise a plurality thereof corresponding to the plurality of nipples.

The plurality of cable member passageways may diverge outwardly in a direction toward the first open end of the elastomeric outer seal. In addition, the at least one dielectric nipple may comprise at least one dielectric nipple, and the base may further include at least one electrical contact extending outwardly through the at least one dielectric nipple. The cable end passageway may have an enlarged diameter end portion and a reduced diameter intermediate portion respectively receiving the cable jacket and the at least one cable member.

The elastomeric outer seal may have a tapered outer shape adjacent the second open end thereof. The at least one cable member may comprise at least one electrical cable member, or may comprise at least one optical cable member. In other words the sealing apparatus may be used for all-electric cables, all-optical cables, or hybrid electrical/optical cables.

A method aspect of the invention is for sealing a cable end and a cable termination. The cable end may include a cable jacket and at least one cable member extending outwardly therefrom. The cable termination may comprise a base and at least one nipple extending outwardly therefrom. The method may include positioning an elastomeric inner seal having at least one nipple passageway to receive and define a seal with the at least one nipple, and at least one cable member passageway in communication with the at least one nipple passageway to receive and define a seal with the at least one cable member. The method may also include positioning an elastomeric outer seal having opposing first and second open ends, the first open end to engage and define a seal with the base; an elastomeric inner seal passageway to receive the elastomeric inner seal; and a cable end passageway extending in communication with the elastomeric inner seal passageway to the second open end to receive and define a seal with the cable jacket.

BRIEF DESCRIPTION OF THE DRAWINGS

FIG. 5 is an enlarged side elevational view, partially in section, of the cable connector of FIG. 1 with the elastomeric outer seal removed for clarity of explanation.

FIG. 6 is an enlarged cross-sectional view of the elastomeric inner seal as shown in the cable connector of FIG. 5.

FIG. 11 is a side perspective view, partially in section, of the cable connector of FIG. 1 with some of the components removed for clarity of explanation.

FIG. 13 is another side perspective view, partially in section, of the cable connector of FIG. 1 with others of the components removed for clarity of explanation.

DETAILED DESCRIPTION OF THE PREFERRED EMBODIMENTS

Figure 1:
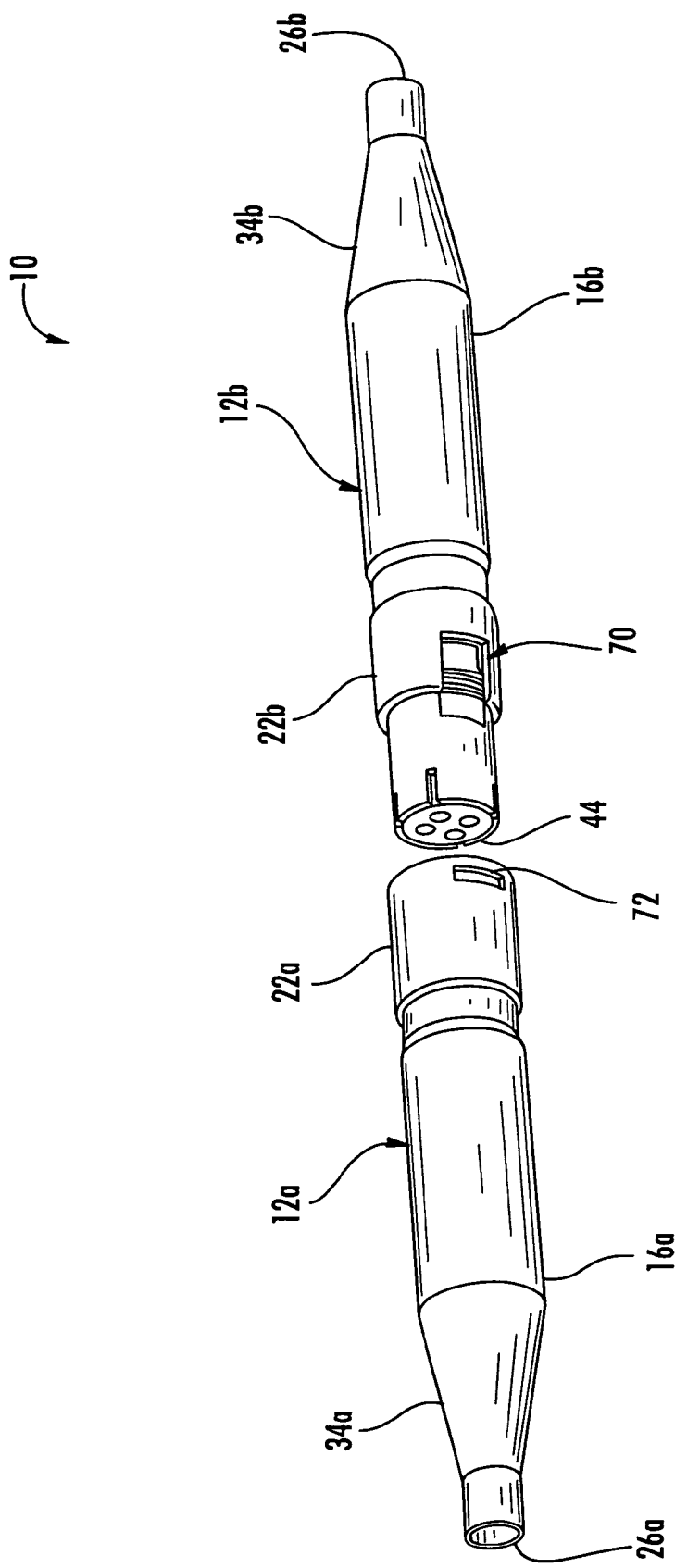
FIG. 1 is a side perspective view of the cable connector in accordance with the invention shown in the unmated position.
Figure 2:
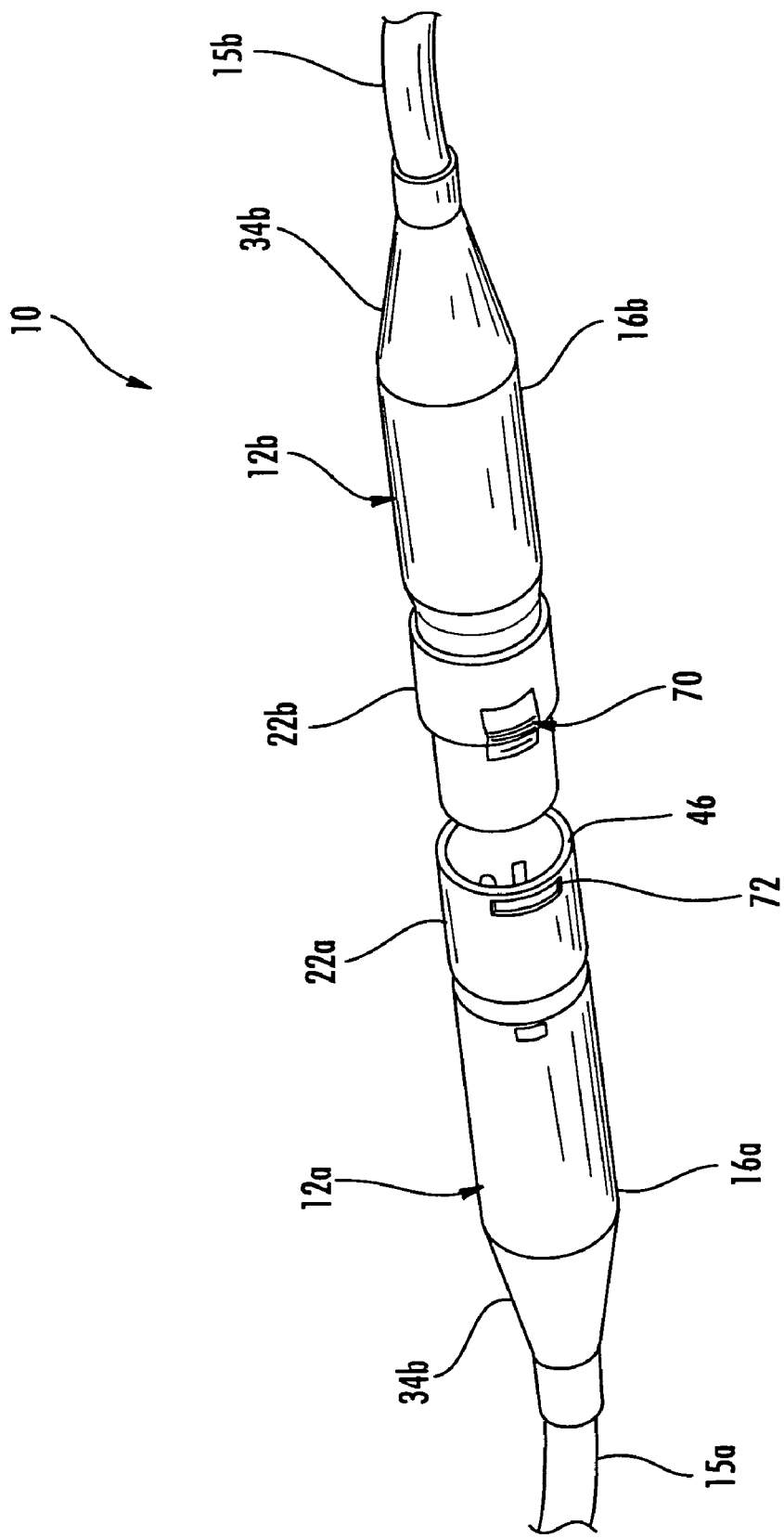
FIG. 2 is a reverse side perspective view of the cable connector of FIG. 1.
Figure 3:
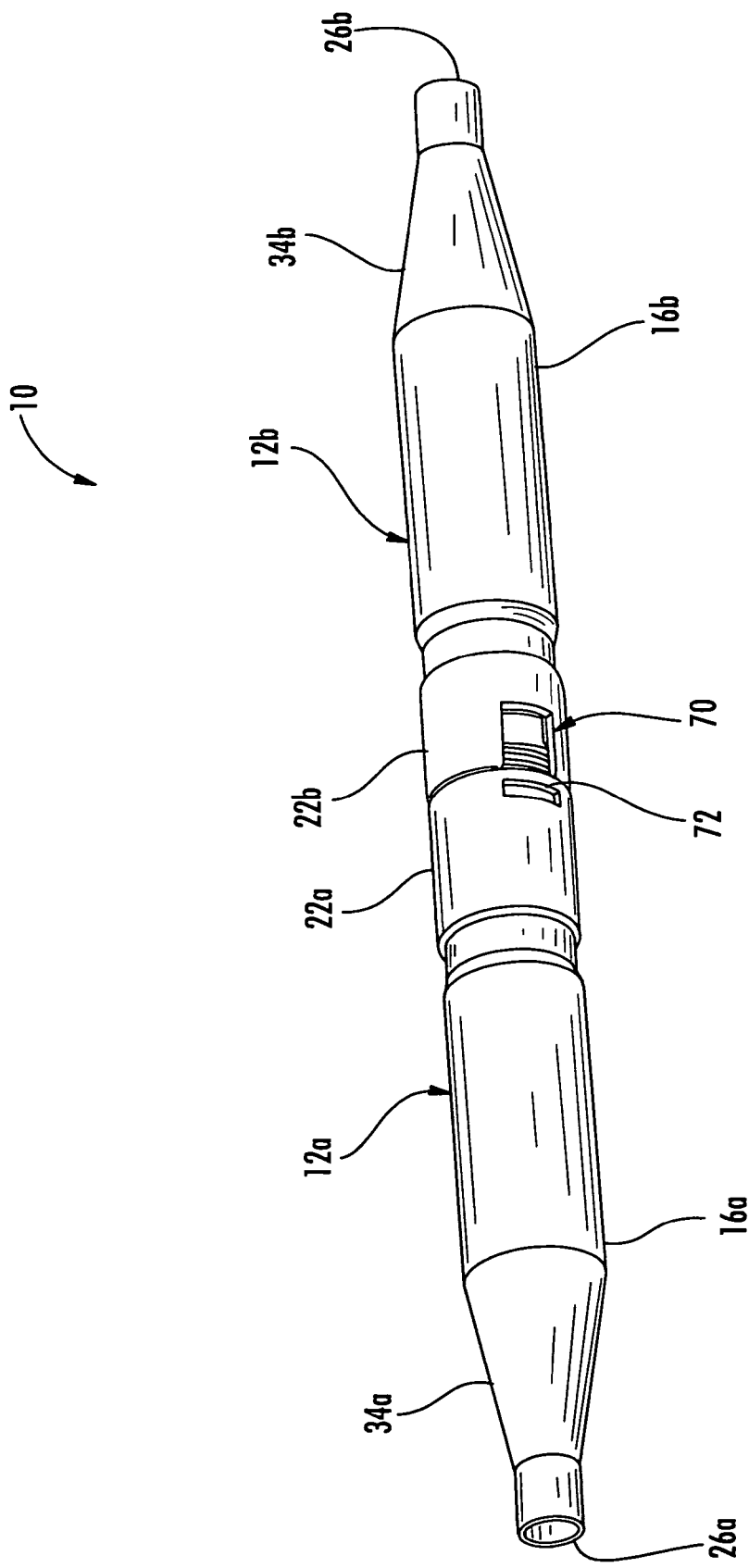
FIG. 3 is a side perspective view of the cable connector of FIG. 1 in the mated position.
Figure 4:
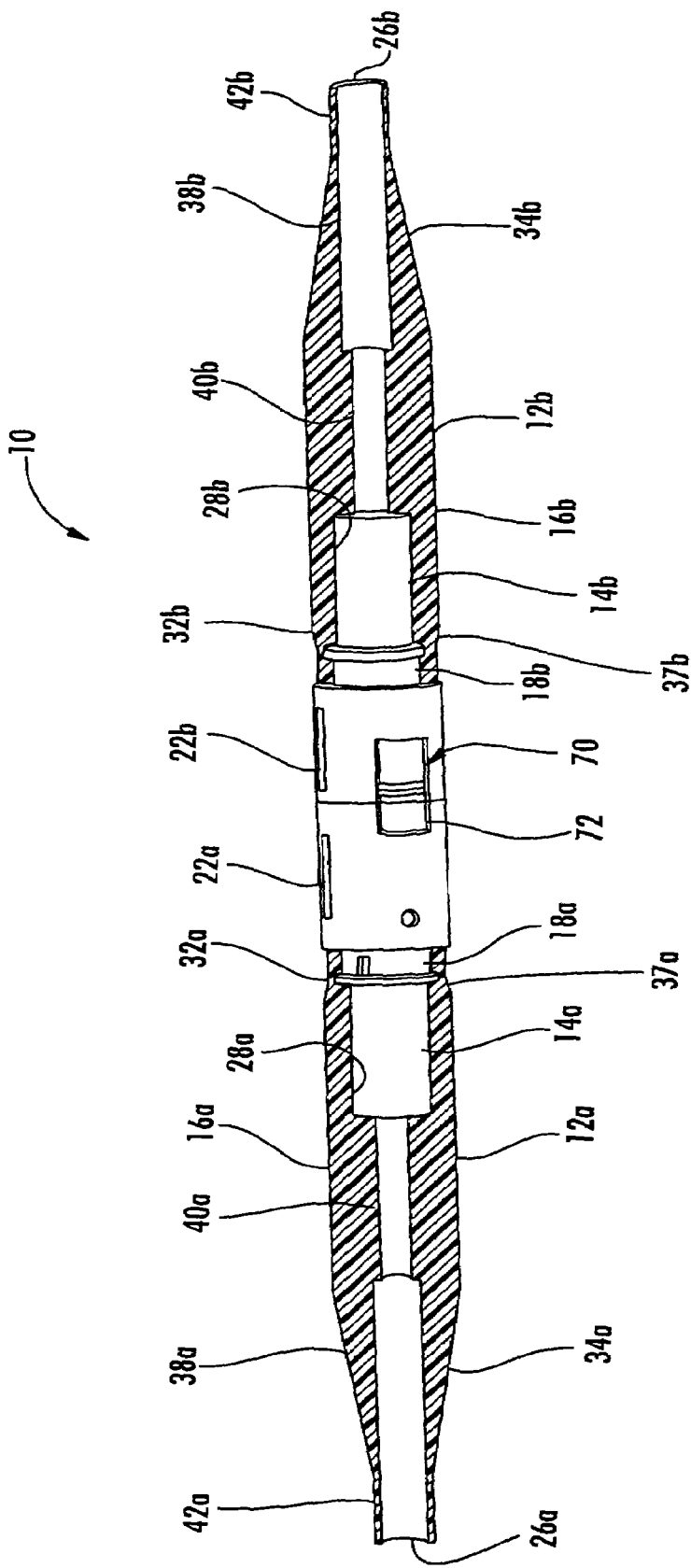
FIG. 4 is a side elevational view, partially in section, of the cable connector as shown in FIG. 3.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1–6, a connector 10 and its sealing apparatus for harsh environments in accordance with the invention is now described. The connector 10 illustratively comprises first and second connector portions 12a, 12b being movable between unmated and mated positions as will be appreciated by those of skill in the art. Each connector portion 12a, 12b includes an elastomeric inner seal 14a, 14b and an elastomeric outer seal 16a, 16b surrounding the inner seal. More particularly, each connector portion 12a, 12b illustratively includes a base 18a, 18b, a plurality of electrical contacts 20a, 20b carried by the base and extending rearwardly therefrom, and a shell 22a, 22b carried by the base and extending forwardly therefrom. Each base 18a, 18b also includes a plurality of dielectric nipples 30a, 30b through which the respective electrical contacts 20a, 20b extend. Each elastomeric inner seal 14a, 14b is positioned adjacent the respective base 18a, 18b on a rear side thereof.

With particular reference to FIGS. 5 and 6, the elastomeric inner seal 14a has nipple passageways 29a for receiving respective nipples 30a therein, and has cable member passageways 24a, 24b for receiving the respective cable members therein. The cable member passageways 24a are in communication with the nipple passageways 29a. Intermediate diameter passageways 27a may be optionally provided to accommodate the electrical contacts 20a that may have a diameter between those of the cable member and nipple. In other embodiments, the cable member passageways 24*a* may simply stretch to accommodate the contacts 20*a* as will be appreciated by those skilled in the art.

Each elastomeric outer seal 16*a*, 16*b* is carried by the base 18*a*, 18*b*, and has a cable-end passageway 26*a*, 26*b* therein. In addition, each elastomeric outer seal 16*a*, 16*b* may also have an inner seal passageway 28*a*, 28*b* therein aligned with the cable-end passageway 26*a*, 26*b* for receiving the elastomeric inner seal 14*a*, 14*b*. The combination of the elastomeric inner seal 14*a*, 14*b* and the elastomeric outer seal 16*a*, 16*b* provide an effective seal, such as against water ingress, and may also be readily assembled onto a cable end in the field, if desired.

The nipple passageways 29*a* may define a constrictive seal with the nipples 30*a* that is devoid of adhesive. The cable member passageways 24*a*, 24*b* and the cable members 20*a*, 20*b* may also define constrictive seals therebetween also devoid of adhesive as will be appreciated by those of skill in the art to thereby facilitate field assembly and disassembly. Similarly, the inner seal passageway 28*a*, 28*b* and the elastomeric inner seal 14*a*, 14*b* may define a constrictive seal therebetween, such as also devoid of adhesive.

Each base 18*a*, 18*b* includes a sealing flange 32*a*, 32*b*, and the elastomeric outer seal 16*a*, 16*b* may have a flange receiving recess 37*a*, 37*b* therein to define a constrictive seal with the sealing flange. As noted above, this seal may also be devoid of adhesive to facilitate field assembly and disassembly.

In some embodiments as few as one pair of contacts may be used as will be appreciated by those skilled in the art. In the illustrated embodiment, the contacts 20*a*, 20*b* and associated nipples 30*a*, 30*b* comprise a plurality carried by the base 18*a*, 18*b* in spaced apart relation. In these embodiments, the nipple passageways 29*a*, 29*b* include a plurality thereof corresponding to the plurality of contacts 20*a*, 20*b*. In addition, the cable member passageways 24*a*, 24*b* include a corresponding plurality thereof and these are arranged to diverge outwardly in a direction toward the base 18*a*, 18*b* or, considered in other terms, toward a first open end of the elastomeric outer seal 16*a*, 16*b* that is adjacent the base.

Each cable-end passageway 26*a*, 26*b* also illustratively has an enlarged diameter end portion 38*a*, 38*b* and a reduced diameter intermediate portion 40*a*, 40*b*. The enlarged diameter end portion 38*a*, 38*b* may constrictively seal against the jacket of the cable, while the intermediate reduced diameter portion 40*a*, 40*b* retains the inner members, for example, individual insulated wires, of the cable with the overall jacket stripped back therefrom. This stepped configuration reduces unnecessary voids within the elastomeric outer seal 16*a*, 16*b* when a cable is inserted therein thereby reducing deformation of the elastomeric outer seal under pressure. In addition, each elastomeric outer seal 16*a*, 16*b* may have a tapered outer shape 34*a*, 34*b* adjacent a cable-receiving end 42*a*, 42*b* thereof to provide greater flexibility adjacent the end.

Each elastomeric outer seal 16*a*, 16*b* and elastomeric inner seal 14*a*, 14*b* may comprise an elastomeric material, such as natural rubber, for example, although other similar synthetic elastomeric materials may also be used as will be appreciated by those skilled in the art. As will also be appreciated by those skilled in the art, the sealing apparatus comprising the elastomeric inner and outer seals may be used with only a single connector portion in other embodiments. In other words, the sealing apparatus may be used between a cable end and any cable termination, such as the illustrated connector portion, or for a bulkhead connector etc. as will be appreciated by those skilled in the art. The sealing apparatus as described herein is readily assembled and/or disassembled in the field thereby overcoming the disadvantages of the prior art sealing arrangements, such as those requiring heat shrink materials or potted polyurethane, for example.

Figure 7:
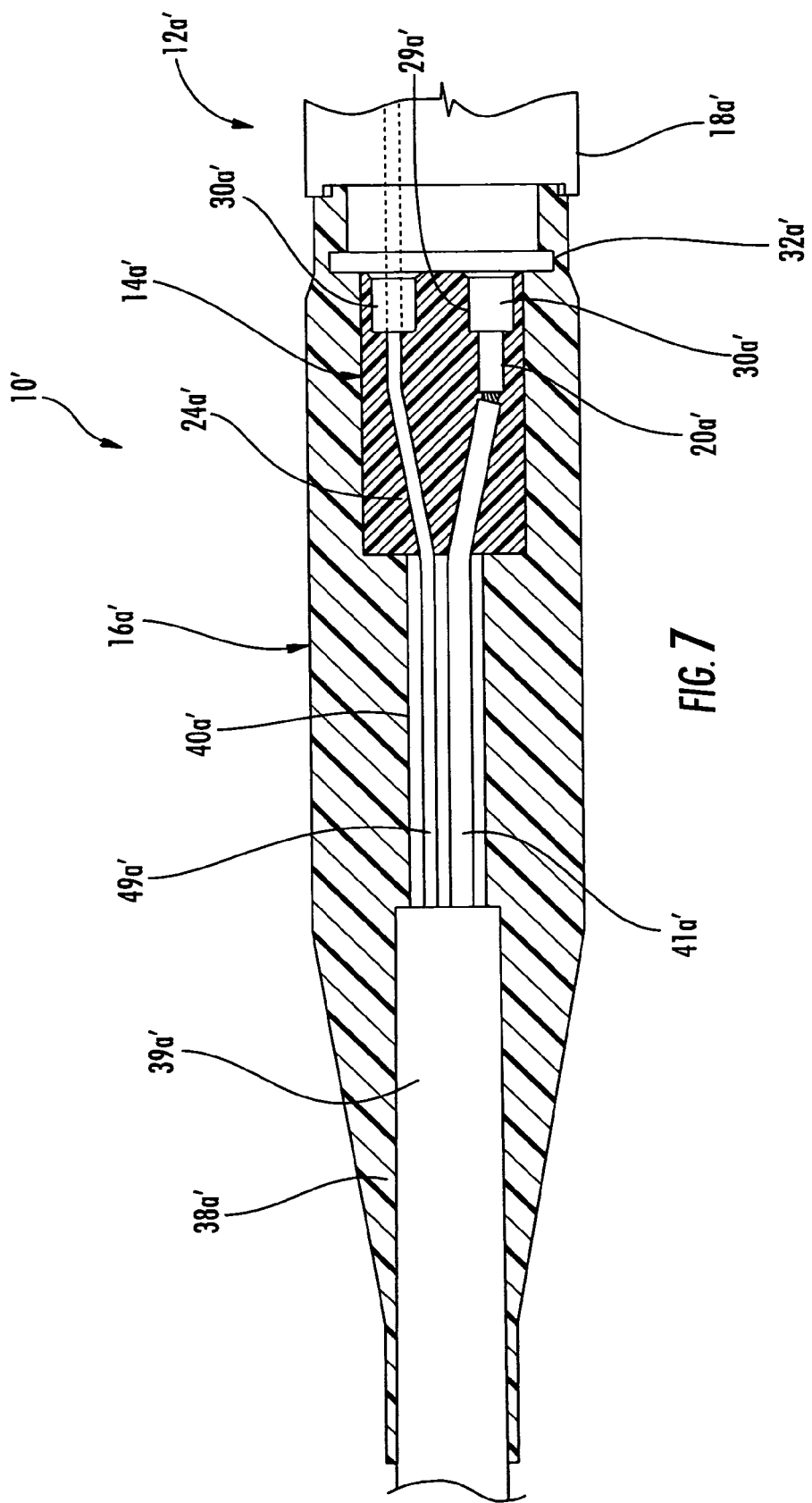
FIG. 7 is a side elevational view, partially in section, of a connector portion for a hybrid cable including an electrical and an optical cable member in accordance with an alternative embodiment of the invention.

Referring now briefly to FIG. 7, another embodiment of a connector portion or cable termination 12*a* including the sealing apparatus is now described that is used in combination with a hybrid fiber optic and electrical cable 39*a'*. For simplicity of explanation the hybrid cable 39*a'* illustratively includes a single electrical cable member 41*a'* and a single optical fiber cable member 49*a'* extending from the protective jacket as shown in the illustrated embodiment. Of interest, the optical fiber cable member 49*a'* extends through a passageway in the upper nipple 30*a'*. In contrast, the electrical cable member 41*a'* may be soldered to the contact 20*a'* carried by the lower nipple 30*a'*. As will be appreciated by those skilled in the art, the sealing apparatus provided by the illustrated elastomeric inner and outer seals 14*a'*, 16*a'* may be used for many cable types including an all-fiber optic cable, for example. As will also be understood by those skilled in the art, the intermediate passageway 40*a'* surrounding the optical cable member 49*a'* and electrical cable member 41*a* is likely to be much more closely fitting than shown in the drawing figure which is exaggerated for ease of explanation.

Figure 8:
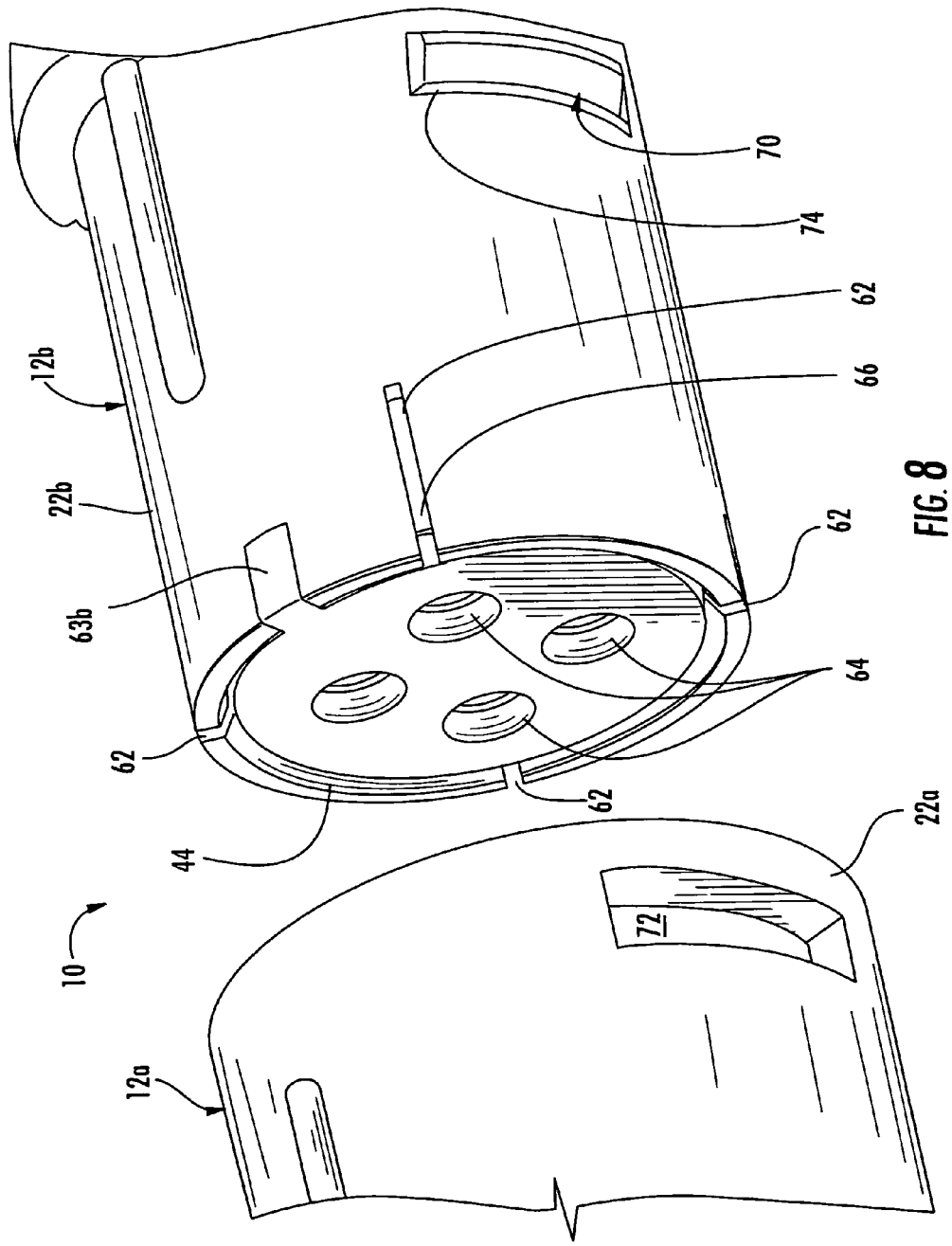
FIG. 8 is a greatly enlarged side perspective view of the mating portions of the cable connector of FIG. 1 illustrating the end cap.
Figure 9:
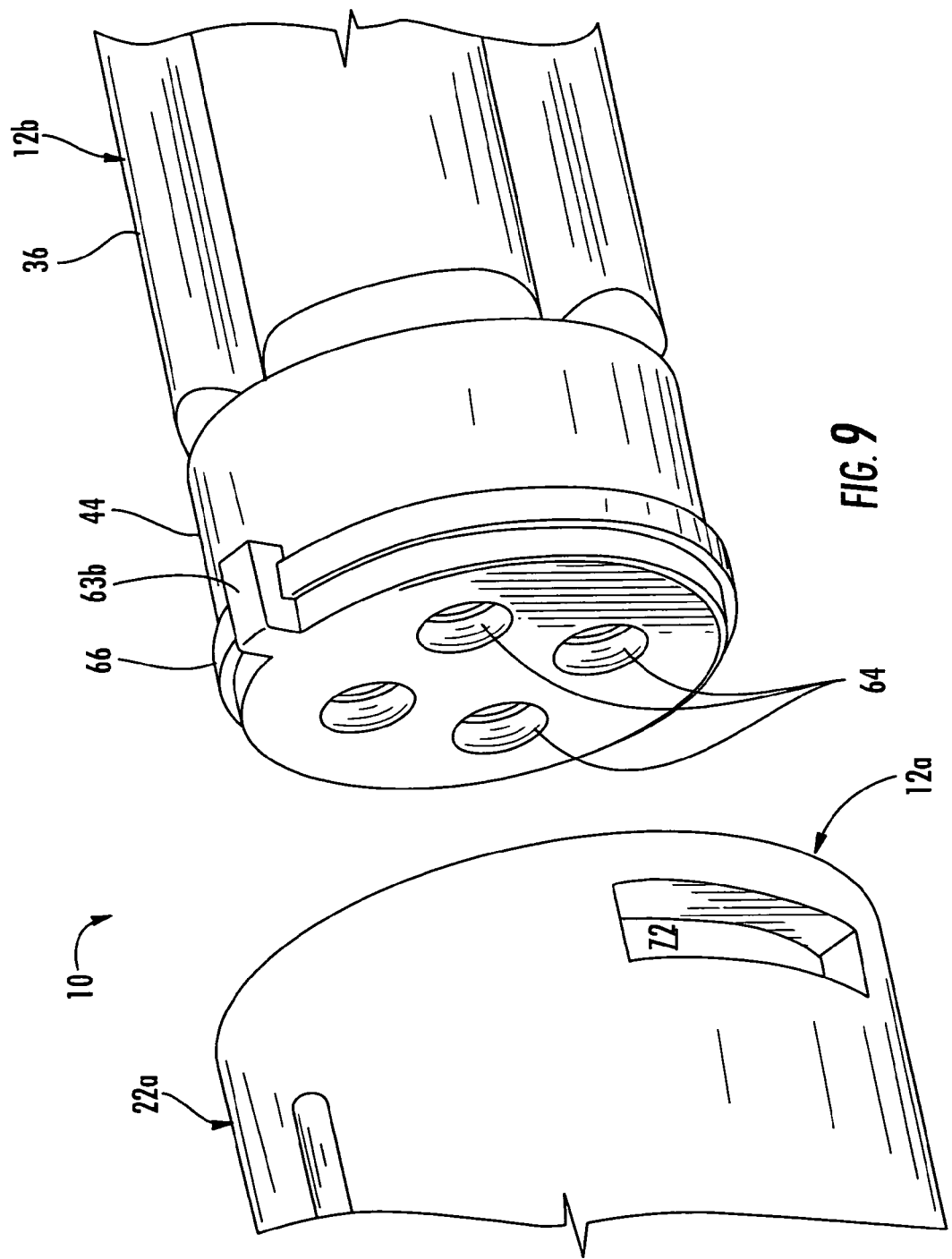
FIG. 9 is a side perspective view of the cable connector as shown in FIG. 8 with the second shell removed for clarity of explanation.
Figure 10:
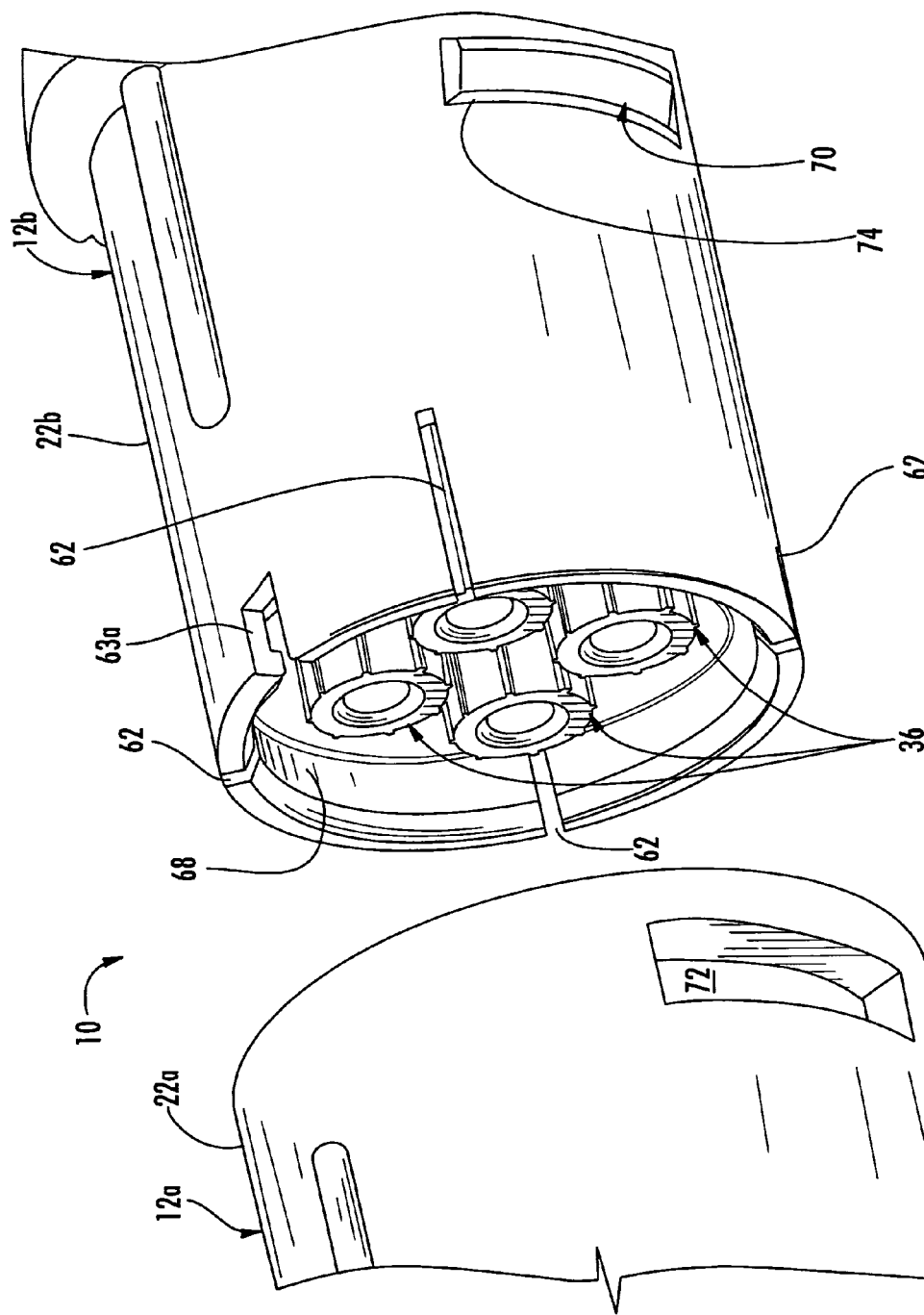
FIG. 10 is a side perspective view of the cable connector as shown in FIG. 8 with the end cap removed for clarity of explanation.

Referring now additionally to FIGS. 8–10, other features and advantages relating to the end cap 44 of the connector 10 are now described. A bladder 36 is carried by the second base 18*b* and surrounds the female contacts 48. The second connector portion 12*b* further includes the integrally molded, disk-shaped, monolithic end cap 44 that surrounds the bladder 36 at end portions thereof opposite the second base 18*b*. The second connector portion 12*b* also includes a second shell 22*b* carried by the second base 18*b* and surrounding the bladder 36 and the end cap 44.

The connector 10 may further comprise a dielectric, such as a silicone oil, contained within the bladder 36 as will be appreciated by those of skill in the art. The end cap 44 has a series of passageways 64 therein to surround the end portions of the bladder 36. More particularly, the end cap 44 may serve to retain and align the end portions of the bladder 36.

The integrally molded, disk-shaped, monolithic end cap 44 is in contrast to the multi-piece end cap assemblies, such as in prior art connectors. The end cap 44 may be readily manufactured using conventional plastic molding techniques, for example, as will be appreciated by those skilled in the art.

The end cap 44 is illustratively carried by adjacent portions of the second shell 22*b*. The end cap 44 and the adjacent portions of the second shell 22*b* may comprise respective mating portions to provide a snap fit engagement therebetween, for example, to facilitate assembly. The end cap 44 illustratively comprises an enlarged diameter flange 66, and the second shell 22*b* comprises a recess 68 for receiving the enlarged diameter flange therein in a snap fit engagement. The second shell 22*b* also includes a series of circumferentially spaced slits 62 to provide resiliency for the snap fit engagement as will be appreciated by those skilled in the art.

A key alignment feature is also provided in the form of the tab 63*b* carried by the end cap 44 and a corresponding slot 63*a* formed in the second shell 22*b*. Of course, those skilled in the art will appreciate that other respective mating portions may be provided on the end cap 44 and second shell 22b to provide the snap fit engagement.

Figure 12:
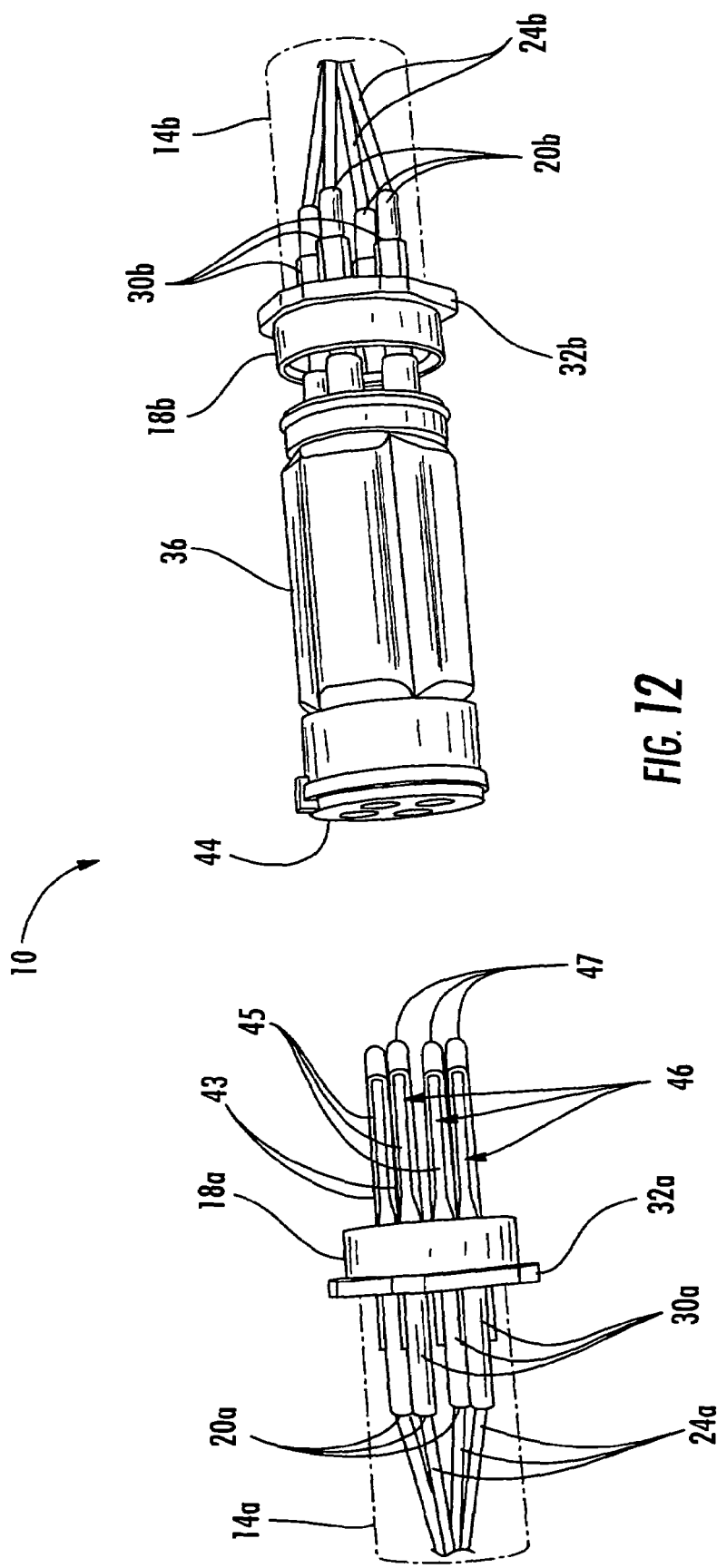
FIG. 12 is another side perspective view, partially in section, of the cable connector of FIG. 1 with others of the components removed for clarity of explanation.

Referring now additionally to FIGS. 11–12, the female contact 48 illustratively comprises a guide tube 50, a moveable stopper 52 received in an end of the guide tube, and a spring 54 urging the stopper toward the end of the guide tube. The female contact 48 also illustratively includes a band-seat 61. The band-seat 61 may surround a contact band, not shown in FIGS. 11–12, but perhaps best shown and identified as contact band 56 in FIG. 15.

The male contact 46 may comprise a dielectric tube 43, and an electrically conductive member 45 extending therethrough and terminating beyond an end thereof to define an electrically conductive tip 47 as will be appreciated by those of skill in the art. In other words, the electrically conductive member 45 may include a dielectric layer 43 surrounding a portion thereof to define an electrically conductive tip.

Figure 14:
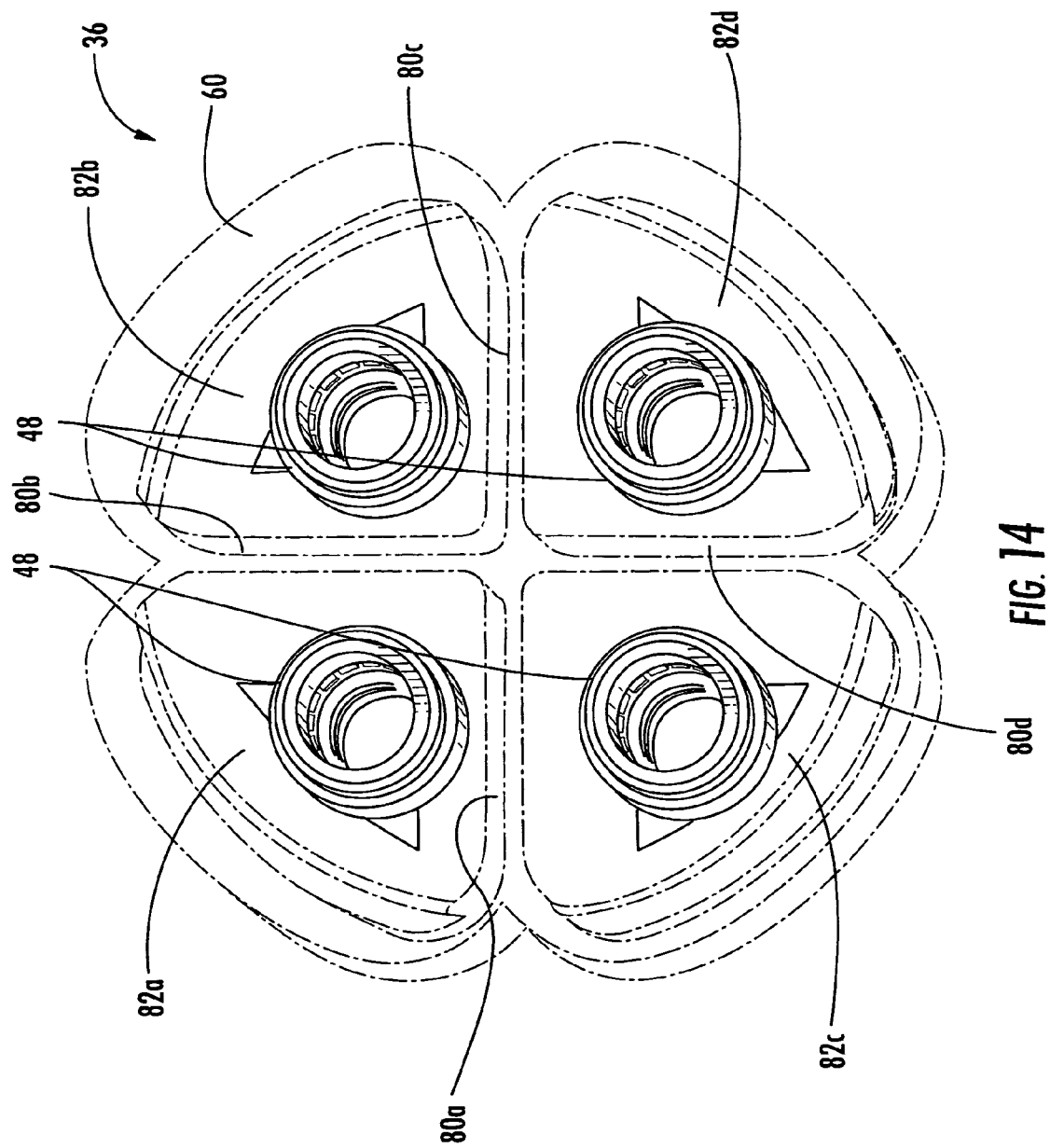
FIG. 14 is an enlarged transverse cross-sectional view of the single-level bladder of the connector of FIG. 1.
Figure 15:
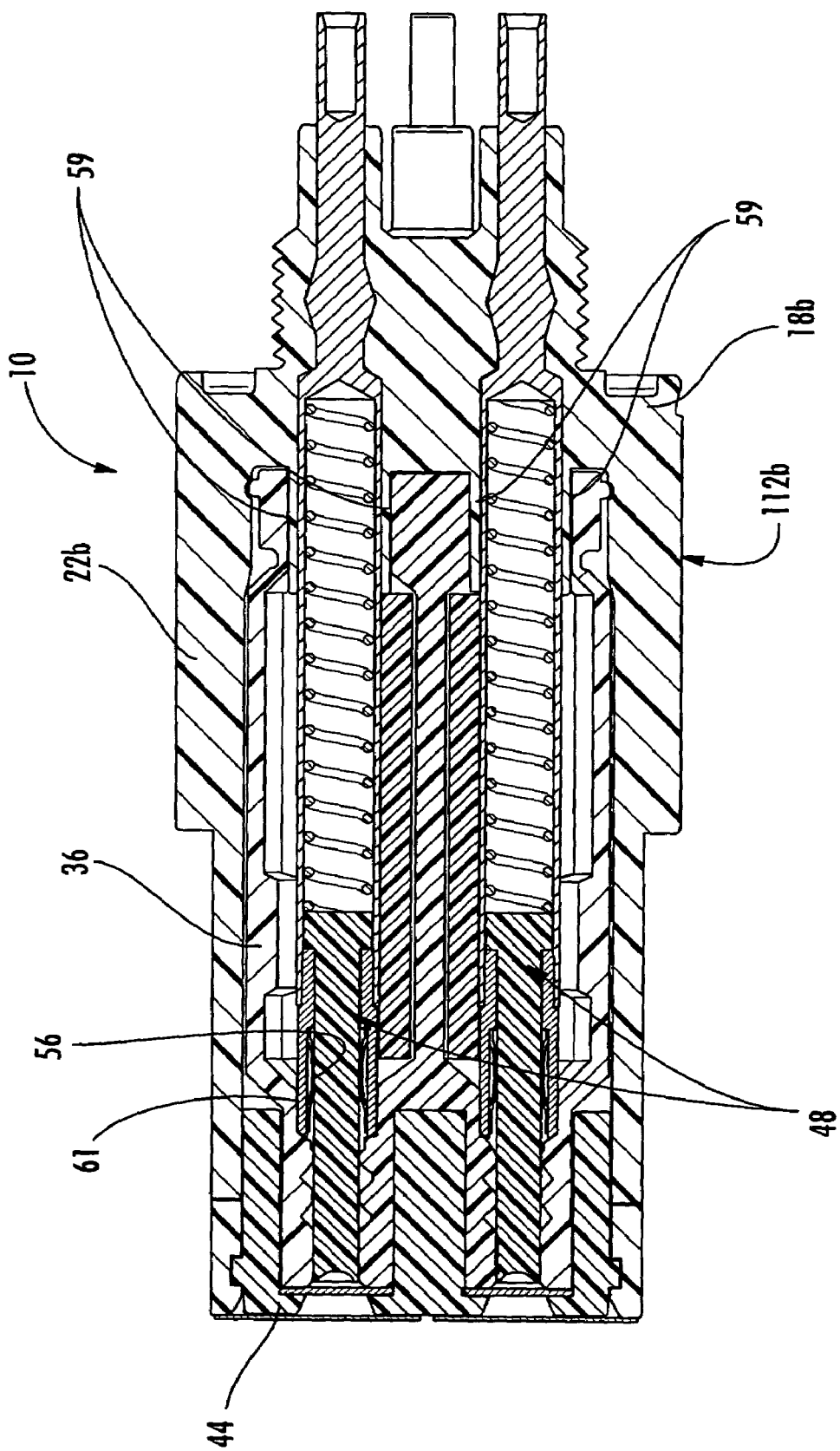
FIG. 15 is a longitudinal cross-sectional view of the single-level bladder and connector portion as shown in FIG. 1.

Referring now additionally to FIGS. 13–15, other features and advantages of the connector 10 as related to the bladder 36 are now described. The second connector portion 12b further comprises the bladder 36 carried by the base 18b. Moreover, the bladder 36 is illustratively a single-level bladder. By single-level is meant that only a single dielectric retaining chamber is defined around each female contact 48. The single-level bladder 36 comprises an outer wall 60 and at least one wall partition 80a–80d therein defining a respective single-level bladder chamber 82a–82d for each of the female contacts 48, for example. The outer wall 60 and the at least one wall partition 80a–80d may be integrally formed as a monolithic unit. The end cap 44 surrounds the single-level bladder 36 at end portions thereof opposite the second base 18b. This single-level bladder 36 is less complex than prior art multi-level bladders, yet still provides reliable sealing as will be appreciated by those skilled in the art. The structure of the end cap 44 in cooperation with the end seal portions of the bladder 36, provides improved positioning and sealing over the previous end-seal constructions of the Nautilus™ connectors as well as those manufactured by Tronic of Cumbria, United Kingdom. It also obviates the need for redundant end-seals, such as incorporated into Tronic's outer bladder as will be appreciated by those skilled in the art.

Another aspect of the connector 10 is that the ends of the bladder 36 adjacent the base 18b may also form effective constrictive seals with adjacent portions of the inwardly extending nipples 59 as perhaps best understood with reference to FIG. 15. The inwardly extending nipples 59 are aligned with the respective female contacts 48 as will be appreciated by those skilled in the art.

The prior art Nautilus outer bladder was added to enclose a benign outer environment for the inner bladders in case of flaws in the inner bladder walls. The wall thickness, and hence durability of the Nautilus inner bladders may be difficult to verify, rendering them potentially fragile. The present monolithic multi-chambered, single-level bladder 36 reduces the chambers' area exposed to the outer environment by much more than half compared to previous constructions. One reduction comes from the shared inner partitions. The other reduction comes from the foreshortening offered by the internal nipples 59. The multi-chambered monolithic, single-level bladder 36 may be correspondingly more reliable than those of either the Tronic or Nautilus prior art connectors, and therefore may not have the same need for protection. The internal partitions serve to keep the chambers of the bladder 36 axially aligned, and reduce the tendency squirm out of position present in other constructions as will be appreciated by those skilled in the art.

Figure 16:
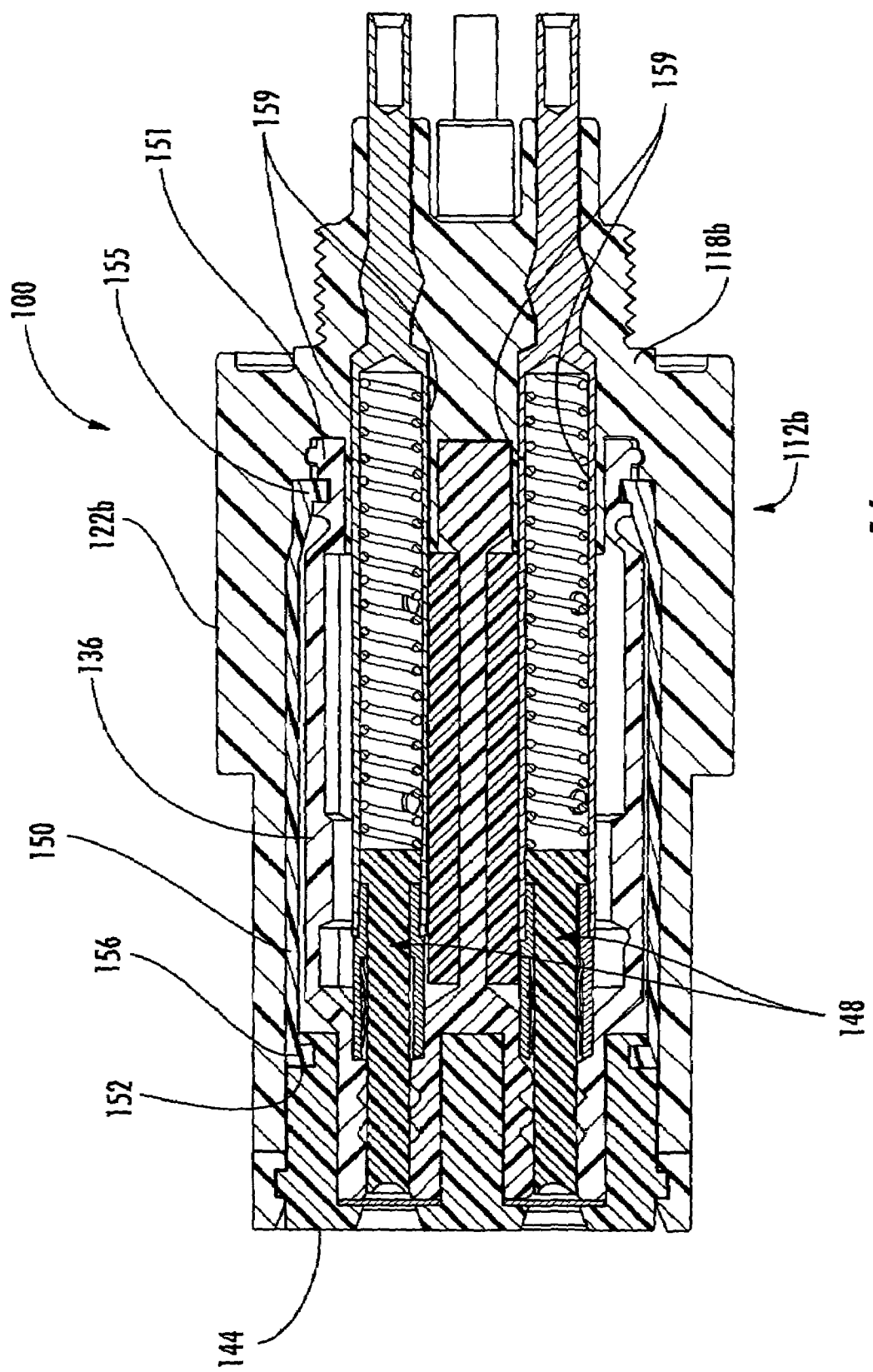
FIG. 16 is a longitudinal cross-sectional view of another embodiment of a connector portion in accordance with the invention and including a dual-level bladder.
Figure 17:
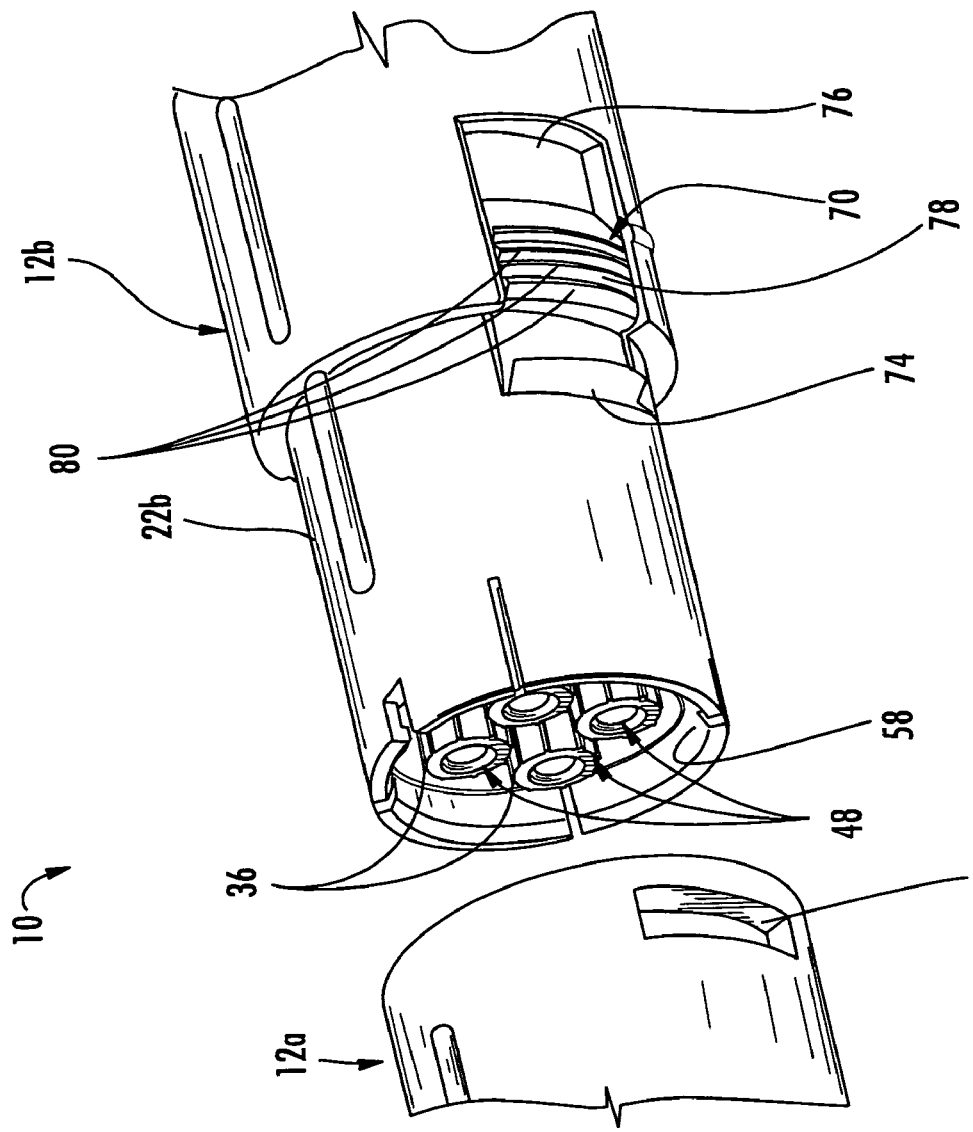

Referring now additionally to FIG. 16 another aspect of the invention relates to dual-level bladder connector 100. The connector 100 may include first and second connector portions movable between unmated and mated positions as described above. As also described above, the first connector portion may comprise a first base, at least one male contact carried by the first base and extending outwardly therefrom, and a first shell carried by the first base and surrounding the at least one male contact. The second connector portion 112b is illustrated in FIG. 16 and includes a second base 118b, a plurality of female contacts 148 carried by the second base and extending outwardly therefrom, an inner bladder 136 carried by the second base surrounding the female contacts, and an end cap 144 defining a seal to end portions of the inner bladder opposite the second base.

The second connector portion 112b also illustratively includes an outer bladder 150 surrounding the inner bladder 136, and a second shell 122b carried by the second base 118b and surrounding the outer bladder and the end cap 144. The outer bladder 150 defines a first seal with the inner bladder 136 adjacent the base 118b and defines a second seal with the end cap 144. The inner bladder 136 illustratively has a first recess 151 on an outer surface thereof, and the outer bladder 150 comprises a first inwardly extending flange 155 received in the first recess to define the first seal. Similarly, the end cap 144 illustratively has a second recess 152 on an outer surface thereof, and the outer bladder 150 comprises a second inwardly extending flange 156 received in the second recess to define the second seal.

The second shell 122b also illustratively comprises respective inner surface portions urging the first and second inwardly extending flanges into the respective first and second recesses. The outer bladder 150 creates a second oil chamber around the inner bladder 136 and the inner bladder ends are sealed into the end cap 144 to contain the outer oil volume. The distal ends of the outer bladder 150 are locked and captured into the end cap 144 and adjacent portions of the shell 122b, and the proximal ends of the outer bladder are locked and sealed into the inner bladder 136 and adjacent portions of the shell.

Another aspect of the connector 100 is that the ends of the inner bladder 136 adjacent the base 118b may also form effective constrictive seals with adjacent portions of the inwardly extending nipples 159. The inwardly extending nipples 159 are aligned with the respective female contacts 148 as will be appreciated by those skilled in the art.

Figure 17:
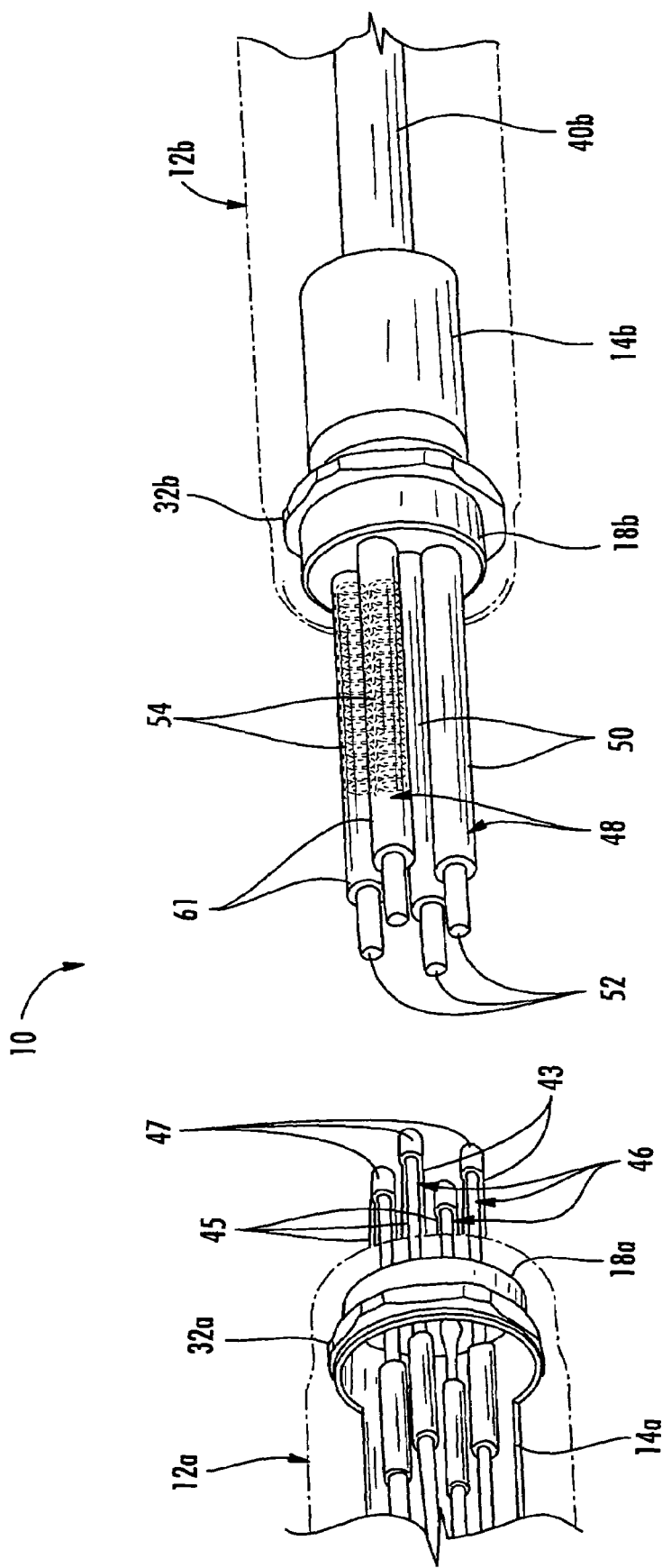
FIG. 17 is an enlarged side perspective view, partially in section, of the mating portions of the cable connector of FIG. 1.

Now with additional reference to FIG. 17, a manual release latching configuration is described for the first and second shells 22a, 22b. In the illustrated embodiment, the second shell 22b includes a manual release latch 70 and the first shell 22a has a corresponding latch opening 72 therein. The manual release latch 70 illustratively includes a fixed end 76, a cantilevered catch end 74 and a medial release portion 78 therebetween, for example. The cantilevered catch end 74 disengages the corresponding latch opening 72 upon depression of the medial release portion 78 as will be appreciated by those of skill in the art.

The medial release portion 78 may extend radially outwardly beyond the fixed end 76 and the cantilevered catch end 74 as shown in the illustrated embodiment. In addition, the medial release portion 78 has a series of grooves 80 therein to facilitate manipulation.

Although only a single latch and latch opening are visible in FIG. 17, the connector would typically include a pair of manual release latches and latch openings on opposing sides of one of the first and second shells 22a, 22b. The first and second shells 22a, 22b each may comprise an integrally molded tubular plastic body into which the latching features may be readily formed as will be appreciated by those skilled in the art.

One method aspect is for sealing a cable end and a cable termination. The cable end may include a cable jacket and at least one cable member extending outwardly therefrom. The cable termination may comprise a base and at least one nipple extending outwardly therefrom. The method may include positioning an elastomeric inner seal having at least one nipple passageway to receive and define a seal with the at least one nipple, and at least one cable member passageway in communication with the at least one nipple passageway to receive and define a seal with the at least one cable member. The method may also include positioning an elastomeric outer seal having opposing first and second open ends, the first open end to engage and define a seal with the base; an elastomeric inner seal passageway to receive the elastomeric inner seal; and a cable end passageway extending in communication with the elastomeric inner seal passageway to the second open end to receive and define a seal with the cable jacket.

Another method aspect is directed to making a connector that may comprise first and second connector portions being movable between unmated and mated positions. The method may comprise forming the first connector portion to include a first base, a male contact carried by the first base and extending outwardly therefrom, and a first shell carried by the first base and surrounding the male contact. The method may also comprise forming the second connector portion to include a second base, a female contact carried by the second base and extending outwardly therefrom, a bladder carried by the second base and surrounding the female contact, an end cap to retain and align end portions of the bladder opposite the second base, and a second shell carried by the second base and surrounding the bladder and the end cap. The method may further comprise, when forming the second connector portion, forming the end cap and the adjacent portions of the second shell to include respective mating portions to provide a snap fit engagement therebetween. The end cap may be an integrally formed monolithic body, such as having a disk shape.

Still another related method aspect is directed to making a connector and may include forming the first connector portion to include a first base, at least one male contact carried by the first base and extending outwardly therefrom, and a first shell carried by the first base and surrounding the at least one male contact. The method may also comprise forming the second connector portion to include a second base, at least one female contact carried by the second base and extending outwardly therefrom, a bladder carried by the second base and surrounding the at least one female contact, an end cap surrounding the bladder at end portions thereof opposite the second base, and a second shell carried by the second base and surrounding the bladder and the end cap. The method may further comprise forming one of the first and second shells to include at least one manual release latch and the other shell to have at least one corresponding latch opening therein. The method may also comprise forming the at least one manual release latch to include a fixed end, a cantilevered catch end and a medial release portion therebetween, the cantilevered catch end disengaging the corresponding latch opening upon depression of the medial release portion.

A further method aspect is also directed to making a connector comprising first and second connector portions to be movable between unmated and mated positions. The method may comprise forming the first connector portion to include a first base, at least one male contact carried by the first base and extending outwardly therefrom, and a first shell carried by the first base and surrounding the at least one male contact. The method further comprises forming the second connector portion to include a second base, at least one female contact carried by the second base and extending outwardly therefrom, a single-level bladder carried by the second base and defining only a single-level bladder chamber surrounding the at least one female contact, and a second shell carried by the second base and surrounding the single-level bladder.

Still another aspect relates to making the dual-level bladder connector embodiments. The method may include forming first connector portion to comprise a first base, at least one male contact carried by the first base and extending outwardly therefrom, and a first shell carried by the first base and surrounding the at least one male contact. The method may also include forming the second connector portion to comprise a second base, at least one female contact carried by the second base and extending outwardly therefrom, an inner bladder carried by the second base surrounding the at least one female contact, an end cap defining a seal to end portions of the inner bladder opposite the second base, an outer bladder surrounding the inner bladder, and a second shell carried by the second base and surrounding the outer bladder and the end cap. Moreover, the outer bladder may define a first seal with the inner bladder adjacent the base and defining a second seal with the end cap.

Other features and advantages of the connector, sealing apparatus, various components and related methods are disclosed in U.S. patent application Ser. No. 11/323,150, titled HARSH ENVIRONMENT CONNECTOR INCLUDING SINGLE-LEVEL OR DUAL-LEVEL BLADDER AND ASSOCIATED METHODS and Ser. No. 11/323,089, titled HARSH ENVIRONMENT ONNECTOR INCLUDING END CAP AND LATCHING FEATURES AND ASSOCIATED METHODS both incorporated herein by reference. Accordingly, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A sealing apparatus operative between a cable end and a cable termination, the cable end comprising a cable jacket and at least one cable member extending outwardly therefrom, the cable termination comprising a base and at least one nipple extending outwardly therefrom, the sealing apparatus comprising:

an elastomeric inner seal having
at least one nipple passageway for receiving and defining a seal with the at least one nipple, and
at least one cable member passageway in communication with the at least one nipple passageway for receiving and defining a seal with the at least one cable member; and an elastomeric outer seal having
opposing first and second open ends, the first open end for engaging and defining a seal with the base,
an elastomeric inner seal passageway for receiving said elastomeric inner seal, and a cable end passageway extending in communication with the elastomeric inner seal passageway to the second open end for receiving and defining a seal with the cable jacket.

2. The sealing apparatus according to claim 1 wherein the at least one nipple passageway defines a constrictive seal with the at least one nipple devoid of adhesive.

3. The sealing apparatus according to claim 1 wherein the at least one cable member passageway defines a constrictive seal with the at least one cable member devoid of adhesive.

4. The sealing apparatus according to claim 1 wherein the first open end of said elastomeric outer seal defines a constrictive seal with the base devoid of adhesive.

5. The sealing apparatus according to claim 4 wherein the base comprises a flange; and wherein the first open end of said elastomeric inner seal has a flange receiving recess therein to receive the flange of the base.

6. The sealing apparatus according to claim 1 wherein the elastomeric inner seal passageway defines a constrictive seal with said elastomeric inner seal devoid of adhesive.

7. The sealing apparatus according to claim 1 wherein the cable end passageway defines a constrictive seal with the cable jacket devoid of adhesive.

8. The sealing apparatus according to claim 1 wherein the at least one nipple comprises a plurality thereof arranged in spaced apart relation; wherein the at least one nipple passageway comprises a plurality thereof corresponding to the plurality of nipples; and wherein the at least one cable member passageway comprises a plurality thereof corresponding to the plurality of nipples.

9. The sealing apparatus according to claim 8 wherein the plurality of cable member passageways diverge outwardly in a direction toward the first open end of said elastomeric outer seal.

10. The sealing apparatus according to claim 1 wherein said at least one nipple comprises at least one dielectric nipple; and wherein the base further comprises at least one electrical contact extending outwardly through said at least one dielectric nipple.

11. The sealing apparatus according to claim 1 wherein the cable end passageway has an enlarged diameter end portion and a reduced diameter intermediate portion respectively receiving the cable jacket and the at least one cable member.

12. The sealing apparatus according to claim 1 wherein said elastomeric outer seal has a tapered outer shape adjacent the second open end thereof.

13. The sealing apparatus according to claim 1 wherein the at least one cable member comprises at least one electrical cable member.

14. The sealing apparatus according to claim 1 wherein the at least one cable member comprises at least one optical cable member.

15. A sealing apparatus operative between a cable end and a cable termination, the cable end comprising a cable jacket and a plurality of cable members extending outwardly therefrom, the cable termination comprising a base and a plurality of nipples extending outwardly therefrom corresponding in number to the plurality of cable members, the sealing apparatus comprising:
an elastomeric inner seal having
a respective nipple passageway for receiving and defining a constrictive seal with each nipple devoid of adhesive, and
a respective cable member passageway in communication with the each nipple passageway for receiving and defining a constrictive seal with a corresponding cable member devoid of adhesive; and
an elastomeric outer seal having
opposing first and second open ends, the first open end for engaging and defining a constrictive seal with the base devoid of adhesive,
an elastomeric inner seal passageway for receiving said elastomeric inner seal, and
a cable end passageway extending in communication with the elastomeric inner seal passageway to the second open end for receiving and defining a seal with the cable jacket.

16. The sealing apparatus according to claim 15 wherein the base comprises a flange; and wherein the first open end of said elastomeric inner seal has a flange receiving recess therein to receive the flange of the base.

17. The sealing apparatus according to claim 15 wherein the elastomeric inner seal passageway defines a constrictive seal with said elastomeric inner seal devoid of adhesive; and wherein the cable end passageway defines a constrictive seal with the cable jacket devoid of adhesive.

18. The sealing apparatus according to claim 15 wherein the plurality of cable member passageways diverge outwardly in a direction toward the first open end of said elastomeric outer seal.

19. The sealing apparatus according to claim 15 wherein the cable end passageway has an enlarged diameter end portion and a reduced diameter intermediate portion respectively receiving the cable jacket and the plurality of cable members.

20. The sealing apparatus according to claim 15 wherein said elastomeric outer seal has a tapered outer shape adjacent the second open end thereof.

21. The sealing apparatus according to claim 15 wherein the plurality of cable members comprise at least one electrical cable member.

22. The sealing apparatus according to claim 15 wherein the plurality of cable members comprise at least one optical cable member.

23. A method for sealing a cable end and a cable termination, the cable end comprising a cable jacket and at least one cable member extending outwardly therefrom, the cable termination comprising a base and at least one nipple extending outwardly therefrom, the method comprising:
positioning an elastomeric inner seal having
at least one nipple passageway to receive and define a seal with the at least one nipple, and
at least one cable member passageway in communication with the at least one nipple passageway to receive and define a seal with the at least one cable member; and
positioning an elastomeric outer seal having
opposing first and second open ends, the first open end to engage and define a seal with the base,
an elastomeric inner seal passageway to receive the elastomeric inner seal, and
a cable end passageway extending in communication with the elastomeric inner seal passageway to the second open end to receive and define a seal with the cable jacket.

24. The method according to claim 23 wherein the at least one nipple passageway defines a constrictive seal with the at least one nipple devoid of adhesive.

25. The method according to claim 23 wherein the at least one cable member passageway defines a constrictive seal with the at least one cable member devoid of adhesive.

26. The method according to claim 23 wherein the first open end of the elastomeric outer seal defines a constrictive seal with the base devoid of adhesive.

27. The method according to claim 23 wherein the elastomeric inner seal passageway defines a constrictive seal with the elastomeric inner seal devoid of adhesive.

28. The method according to claim 23 wherein the cable end passageway defines a constrictive seal with the cable jacket devoid of adhesive.

29. The method according to claim 23 wherein the at least one nipple comprises a plurality thereof arranged in spaced apart relation; wherein the at least one nipple passageway comprises a plurality thereof corresponding to the plurality of nipples; and wherein the at least one cable member passageway comprises a plurality thereof corresponding to the plurality of nipples.

30. The method according to claim 29 wherein the plurality of cable member passageways diverge outwardly in a direction toward the first open end of the elastomeric outer seal.

31. The method according to claim 29 wherein the at least one nipple comprises at least one dielectric nipple; and wherein the base further comprises at least one electrical contact extending outwardly through the at least one dielectric nipple.

32. The method according to claim 23 wherein the cable end passageway has an enlarged diameter end portion and a reduced diameter intermediate portion respectively to receive the cable jacket and the at least one cable member.

33. The method according to claim 23 wherein the elastomeric outer seal has a tapered outer shape adjacent the second open end thereof.

34. The method according to claim 23 wherein the at least one cable member comprises at least one electrical cable member.

35. The method according to claim 23 wherein the at least one cable member comprises at least one optical cable member.

* * * * *